(No Model.) 2 Sheets—Sheet 2.
H. G. BLYTHE.
APPARATUS FOR THE MANUFACTURE OF WHITE LEAD.
No. 322,782. Patented July 21, 1885.
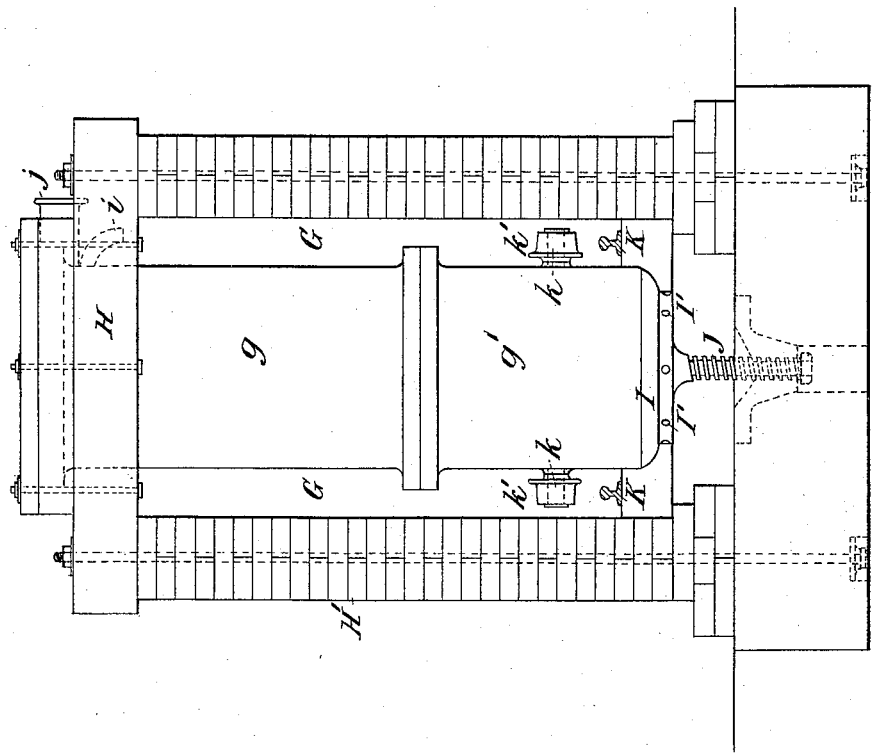
Witnesses.
Geo. W. Rea.
Robert Everett.
Inventor.
Henry G. Blythe.
By James L. Norris.
Atty.

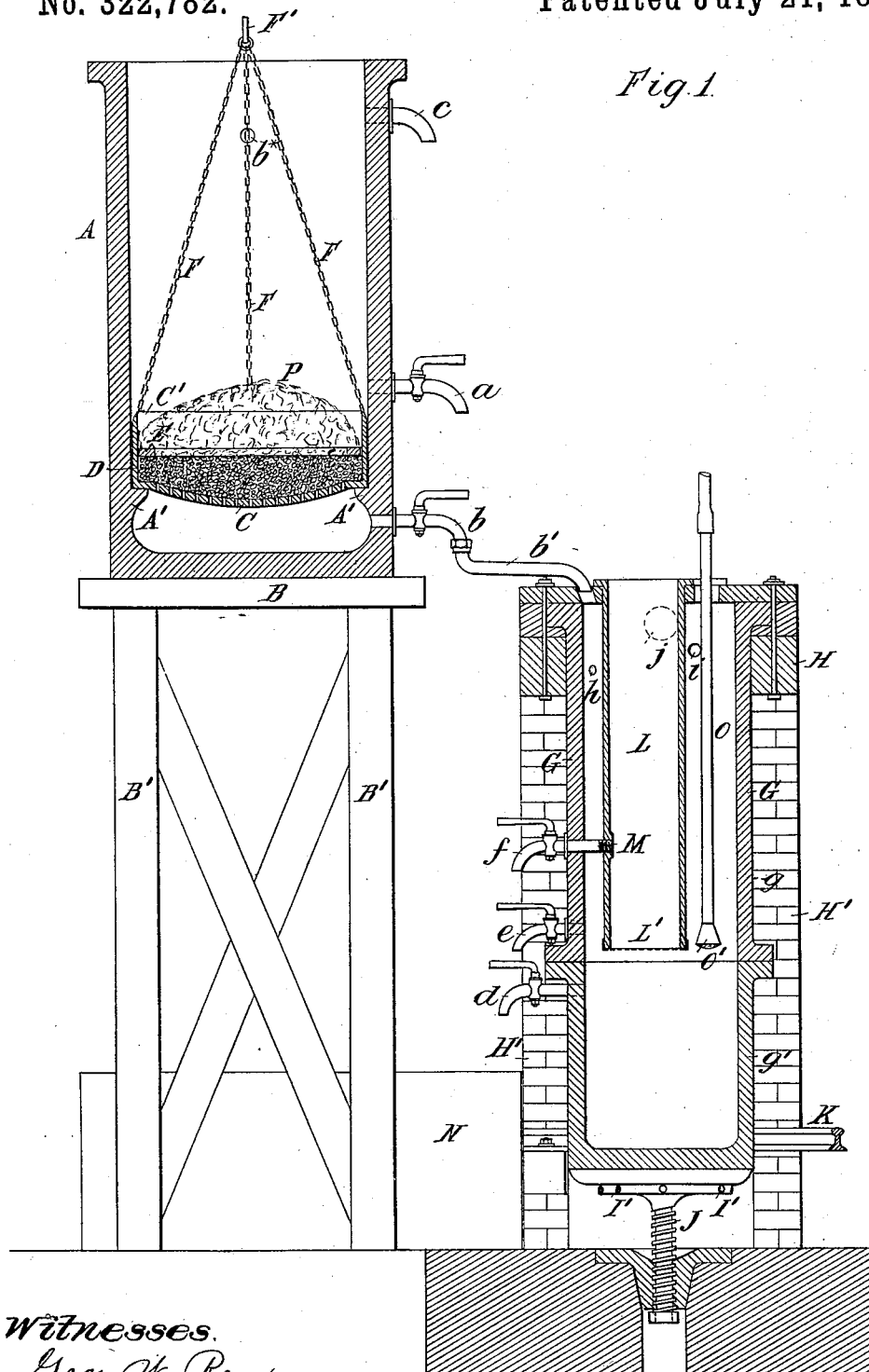

UNITED STATES PATENT OFFICE.

HENRY GERARD BLYTH, OF LONDON, ENGLAND.

APPARATUS FOR THE MANUFACTURE OF WHITE LEAD.

SPECIFICATION forming part of Letters Patent No. 322,782, dated July 21, 1885.

Application filed April 22, 1885. (No model.) Patented in England July 19, 1884, No. 10,375.

*To all whom it may concern:*

Be it known that I, HENRY GERARD BLYTH, mining engineer, a subject of the Queen of Great Britain, and residing at London, England, have invented new and useful Improvements in Apparatus for the Manufacture of White Lead, (for which I have obtained a patent in Great Britain, No. 10,375, bearing date July 19, 1884,) of which the following is a specification, reference being had to the accompanying drawings.

My invention relates to the manufacture of white lead and to apparatus therefor, and is chiefly designed to provide for the production of white lead from very impure litharge or other oxides, which can be obtained at less cost than those used in the processes heretofore adopted. It is also designed to facilitate the extraction and collection of the impurities in the oxides employed, so that the said impurities can be utilized for various purposes.

By my invention I am enabled to employ in the manufacture of white lead oxides such as those obtained by the cupellation of impure Spanish or other lead, or by the heating of mineral or native carbonates of lead, as hereinafter described, to a temperature just sufficient to drive off the carbonic acid, leaving the oxide uncombined. These oxides are very impure, the impurities in the case of the Spanish or other lead being metallic and of considerable value, and in the case of the carbonates of lead consisting chiefly of calcareous or silicious matter. If there is much calcareous matter combined with it the crude oxide cannot be used advantageously for my process.

In manufacturing white lead according to my invention I dissolve the oxide, (by means of acetate or sugar of lead,) filter the same, and collect the insoluble impurities in one vessel and pass the liquid from this vessel into another vessel, in which I precipitate the white lead by means of carbonic-acid gas. The lower part of the last-named vessel is detachable or removable, so that the white lead precipitated therein can be conveyed or transferred to any desired place without handling. I prefer to construct this vessel in such a manner that during the precipitation of the white lead the liquid contained in the said vessel will pass through suitable filtering material, and can be continuously run off and collected in a tank or other receptacle, to be again used in my process. I sometimes employ a series of the said vessels connected by suitable pipes and so arranged that while some of them are in operation the others can be emptied and recharged.

My improved apparatus is illustrated in the accompanying drawings, in which Figure 1 is a vertical central section of my apparatus, some parts being shown in elevation; and Fig. 2 is a front elevation of part of the said apparatus.

Like letters indicate corresponding parts in these figures.

A is a vessel, which is of cylindrical or other suitable form, and is made of glazed earthenware, wood, slate, or other material of sufficient strength, and not liable to be injuriously affected by the substances used in the manufacture of the white lead; or it may be made of earthenware drain-pipe of large diameter. This vessel is supported upon a firm bed or platform, B, of stone, wood, or other suitable material, which bed or platform is supported by wood or iron standards or posts B', or by masonry or otherwise. Within the vessel A, preferably from six to twelve inches from the bottom thereof, a rim or projection, A', or other suitable support, is provided, upon which is placed a perforated disk or plate, C, hereinafter more fully described.

The vessel A is provided with two cocks, $a$ $b$, for the purposes hereinafter specified, and, in some instances, with a pipe at $b^*$, whereby it can be connected with a similar vessel, if desired. It is, moreover, provided at a suitable height with an overflow-pipe, $c$, to be connected with a tank or other receptacle, from which the liquor can, if desired, be pumped back into the vessel A.

The perforated disk or plate C is slightly smaller in diameter than the interior of the vessel A. It is bulged downward, as shown, in order to strengthen it. Upon this disk or plate are the pieces C', formed integrally with or firmly secured to the said disk or plate, and extending upward therefrom, say, from six to eighteen inches. On the said disk or plate in the chamber formed by the pieces C' is placed, as shown at D, a layer of twigs, pebbles, coarse sand, or other material through which the dissolved oxide can easily permeate, and upon this layer is placed a piece of cloth or other filtering material, which is stretched more or less tightly over a rim or frame, E, of wood or other suitable material, held together by cross-pieces or in any other suitable manner. The disk or plate C is provided with chains F F', or other suitable means, whereby it may be raised from or lowered upon its support by a windlass, crab, or small crane.

G is a vessel, which is of cylindrical or other suitable form, and is connected with the vessel A by a pipe, $b'$. This vessel consists of an upper part, $g$, and a lower part, $g'$. The said upper part is open at both ends or at the lower end only. The lower part, $g'$, serves as a receiver for the white lead. Leakage between the adjacent flanges or surfaces of these two parts is prevented by inserting between the same a ring or piece of india-rubber, tarred hemp, cement, or other suitable packing. The vessel G is provided with two cocks, $d\ e$, and, in some cases, with a pipe or tube at $h$, to connect it with a similar vessel, if desired. The vessel G also has an overflow-pipe at $i$, designed to be connected with a tank or other receptacle.

The upper part, $g$, of the said vessel is supported by cross-beams H, carried by brick columns H'; or it may be supported in any other convenient manner. A pipe, $j$, is also provided to carry off into a chimney, for example, any gas which may escape through the dissolved oxide contained in the said vessel, and thus prevent any injurious effects arising therefrom. The lower part, $g'$, has trunnions $k$, which are below its center of gravity when empty. These trunnions are provided with rollers $k'$. The part $g'$ rests on a strong disk or plate, I, which can be raised or lowered by (but is prevented from turning with) a screw, J, to raise and lower the part $g'$ and press the same tightly against the lower end of the part $g$, thus preventing leakage between the said parts. In some instances I provide other well-known means for this purpose. The part $g'$ can be removed as follows, viz: The screw J is turned by means of a hand-bar inserted in the holes I' to lower the said disk or plate I until the rollers $k'$ rest on the rails K, whereon the part $g'$ can be readily moved in either direction. The bottom of the part $g'$ is in some cases so made that it can be removed or detached (when the said part is turned over on its trunnions) to permit the removal of the white lead when firmly set; but it must fit closely against the part $g$ when in position in order to prevent leakage, as above stated.

In the upper part of the vessel G is supported a tube, L, which extends slightly above the top of the said vessel, and to within about an inch or two inches of the lower end of the part $g$. A piece, L', of cloth or other filtering material is stretched across the lower end of this tube, so that any liquid contained in the said vessel will slowly filter through such material into the said tube. A pipe, M, extends from the said tube L through the wall or side of the vessel G to the exterior thereof, where it is provided with a cock, $f$. The liquor in the tube L, when it reaches the level of the said pipe M, can flow through the said pipe into a tank, N, whence it is pumped up into the vessel A to be again used in my process.

In the part $g$, I also provide a pipe, O, having a rose, O', at its lower end. Carbonic-acid gas is pumped or forced by any suitable means through this pipe into the liquor contained in the vessel G. The pipe O is so joined to another pipe conducting the gas thereto that it can be easily removed from the liquor for a short time, in order to free the holes in the rose O' from any solid matter adhering thereto.

In the manufacture of white lead according to my invention I employ the old and well-known process of dissolving litharge or lead oxide in acetate or sugar of lead, and precipitating the oxide taken up with carbonic-acid gas; but I carry on this process by means of the apparatus shown in the drawings, or substantially similar apparatus, in the following improved manner—that is to say, a suitable quantity of the litharge or oxide of lead is placed on the perforated disk or plate C in the vessel A, as shown at P. The cock $a$ on the said vessel being closed and the cock $b$ open, a solution of acetate or sugar of lead of any desired strength, but preferably a strong solution, is pumped or otherwise introduced into the vessel A, where it gradually dissolves the litharge or crude oxide. The product percolates through the perforated disk or plate C, and the filtering material thereon, into the lower part of the said vessel, and flows thence through the cock $b$ and the tube or pipe $b'$ into the vessel G. In this vessel it meets with the carbonic-acid gas forced in through the pipe O, and white lead is thrown down or precipitated, and gradually settles to the bottom of the part $g'$. During this precipitation the liquid (acetate or sugar of lead) in the vessel G rises through the diaphragm or piece L' of filtering material into the tube L, and when it reaches the level of the pipe M flows into the tank N, from which it is, if desired, pumped into the vessel A, wherein it can be used to dissolve more oxide, the solution of the oxide by the said liquid not materially affecting the strength of the latter. It will thus be seen that by my apparatus, while the precipitation of the white lead is taking place, the liquid which has been employed for dissolving one quantity of the material used is passed through filtering material, and can be run off and again used. If too much of the liquid is pumped into the vessel A it will flow back into the said tank by the overflow-pipe $c$; or it may be made to flow into a vessel similar to the vessel A by means of the pipe $b^*$.

To charge the perforated disk or plate C with oxide, the latter is either introduced while the said disk or plate rests on its support, or the liquid is first run off and the said plate or disk is raised out of the vessel A.

The liquor drawn off from the vessels A and G may be either run into the same tank or tanks; or each of the said vessels may have a separate tank for this purpose. In the said tank or tanks the liquor is heated in any convenient or well-known manner, if it is found desirable to employ the same at an elevated temperature. Moreover, in some instances, the liquor drawn from the cock $f$ is collected in a different tank from that which receives the liquor from the cocks $d$ and $e$, as that from $f$ is more pure than that from $d$ and $e$.

When the receptacle $g'$ is nearly full of white lead the liquor is drawn off from the vessel G through the cocks $d$ and $e$. The said receptacle is then lowered by the screw J, and, being supported by its trunnions $k$ and rollers $k'$ on the rails K, (which are preferably slightly inclined,) can be easily pushed or moved to any desired place thereon and then turned over to empty it. After the said receptacle is emptied it is again screwed up against the lower end of the part $g$, the cocks are closed, and the process is carried on, as before.

In manufacturing white lead from mineral or native carbonates of lead according to my invention, the said carbonates are cautiously heated to a temperature just sufficient to drive off the carbonic acid or carbon dioxide, ($CO_2$,) leaving the lead oxide (PbO) uncombined and in a condition to be dissolved by acetate or sugar of lead. The oxide is then dissolved and the white lead precipitated, as above described. The white lead obtained as above described is washed in barrels or tanks, collected and dried, and is then pressed, and, if necessary, ground to form a powder. It is then fit for use.

The solution of acetate or sugar of lead may be made in the vessel A, if necessary or advisable, the oxide being mixed or unmixed with it, as desired.

Any impurities in the oxide employed are either dissoved in the liquor, and therefore become concentrated when fresh oxide is used, and can be precipitated when sufficiently concentrated, or they remain on the perforated disk or plate C, in which case they can be collected, washed, dried, and smelted, or treated by well-known chemical processes, to be used for any purpose for which they may be applicable.

In a similar manner the impurities in the solution can be separated and collected by well-known chemical reactions with considerable advantage in may cases.

It is obvious that by collecting the white lead in a receiver, as above described, it can be easily moved or transferred to any desired place without handling.

I might use in this process nitrate of lead, instead of and in the same manner as the acetate or sugar of lead; but I prefer to use the acetate.

I may, if desired, substitute for the vessel A any other suitable apparatus for dissolving the litharge or crude oxide. Moreover, instead of employing the tube L, I may use any suitable chamber or space separated from the space in the vessel G by filtering material for the purpose specified.

Instead of employing the two parts $g$ $g'$, as above described, I sometimes use two vessels suitably connected, and in one of which the carbonic-acid gas is forced into the liquid, the other vessel being used as a receiver for the white-lead, and being removable or detachable for the purpose specified.

I am aware that white lead has been heretofore made by dissolving litharge or lead oxide in acetate or sugar of lead, and then precipitating the white lead by means of carbonic-acid gas. Therefore I do not make any claim to such process, except when carried out in the improved manner above described, and by means of apparatus operating on the principles above set forth.

What I claim is—

1. The combination, with the vessel A for dissolving and filtering the oxide, of the vessel G, composed of an upper stationary section $g$, and a vertically movable and detachable bottom section $g'$, serving as a receiver for the white lead, substantially as described.

2. The combination, with the vessel G, of a tube, L, or equivalent chamber or space, separated from the interior, of the said vessel by filtering material, as at L', whereby, during the precipitation of the white lead, the liquor above the same is filtered and can be continuously run off and collected, thus permitting the continuous introduction of fresh liquid containing the dissolved oxide, substantially as set forth.

3. The combination, with the vessel G, of the cocks $d$ and $e$ for running off the liquid remaining below the cock $f$ in the said vessel when it is desired to remove the precipitated white lead from the part $g'$, substantially as set forth.

4. The combination of the vessel A, provided with the perforated plate C and the cocks $a$ $b$, the vessel G, consisting of the parts $g$ $g'$, and connected with the said vessel A by the pipe $b'$, the tube L, inserted in the said vessel G, and provided with the filtering material L', pipe M, and cock $f$, the tube O, extending downward into the said vessel G, and the cocks $d$ $e$, all substantially as and for the purposes set forth.

In testimony whereof I have hereunto signed my name in the presence of two subscribing witnesses.

HENRY GERARD BLYTH.

Witnesses:
 DAVID YOUNG,
  45 *Southampton Buildings, W. C.*
 JOHN E. BOUSFIELD.